United States Patent
Kim et al.

(10) Patent No.: US 11,587,565 B2
(45) Date of Patent: Feb. 21, 2023

(54) VOICE RECOGNITION SYSTEM AND DISPLAY DEVICE USING THE SAME

(71) Applicant: SAMSUNG ELECTRONICS CO., LTD., Suwon-si (KR)

(72) Inventors: Cheheung Kim, Yongin-si (KR); Jaehyung Jang, Anyang-si (KR); Hyeokki Hong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 226 days.

(21) Appl. No.: 16/920,894

(22) Filed: Jul. 6, 2020

(65) Prior Publication Data
US 2021/0210087 A1    Jul. 8, 2021

(30) Foreign Application Priority Data

Jan. 7, 2020    (KR) .................. 10-2020-0002146

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
USPC ....................................................... 704/1–504
See application file for complete search history.

(56) References Cited

U.S. PATENT DOCUMENTS

| 7,570,773 | B2* | 8/2009 | Ohbayashi | H04R 19/016 381/174 |
| 7,580,782 | B2* | 8/2009 | Breed | G07C 5/085 340/436 |
| 10,141,007 | B1* | 11/2018 | Kim | H04R 11/14 |
| 11,128,710 | B2* | 9/2021 | Binder | G07C 3/02 |
| 2013/0113337 | A1* | 5/2013 | Kasai | G01H 11/08 310/319 |
| 2016/0105740 | A1* | 4/2016 | Suzuki | H04R 7/04 381/333 |
| 2016/0351192 | A1* | 12/2016 | Chu | H04S 7/00 |
| 2017/0299426 | A1* | 10/2017 | Lee | H04R 17/02 |

(Continued)

FOREIGN PATENT DOCUMENTS

| EP | 2 801 974 A2 | 11/2014 |
| KR | 10-2019-0032055 A | 3/2019 |
| KR | 10-1980785 B1 | 8/2019 |

OTHER PUBLICATIONS

Lan Zhang et al., Development and Application of Planar Piezoresistive Vibration Sensor, 2014, Microelectronic Engineering, vol. 119, pp. 70-74.*

(Continued)

*Primary Examiner* — Marcus T Riley
(74) *Attorney, Agent, or Firm* — Sughrue Mion, PLLC

(57) ABSTRACT

Disclosed are a voice recognition system and a display device using the same. The disclosed voice recognition system includes a plate structure, a vibration sensor, and a voice recognition device. The plate structure vibrates based on propagation of a voice wave generated from a user, and the vibration sensor is provided in contact with the plate structure to detect the vibration of the plate structure. The voice recognition device recognizes voice of the user by receiving a signal output from the vibration sensor.

25 Claims, 12 Drawing Sheets

(56) References Cited

U.S. PATENT DOCUMENTS

2018/0308482 A1* 10/2018 Ro .................... G10L 15/26
2019/0106069 A1*  4/2019 Wheeler ............ B60R 16/0373
2020/0213699 A1*  7/2020 You ..................... H04R 1/028
2021/0210087 A1*  7/2021 Kim .................... G10L 15/28
2021/0223577 A1*  7/2021 Zhang ................. H04M 1/03

OTHER PUBLICATIONS

Sara Khalifa et al., "Feasibility and Accuracy of Hotword Detection using Vibration Energy Harvester", IEEE 17$^{th}$ Int'l Symposium on World of Wireless, Mobile and Multimedia Networks, Jun. 21, 2016, 9 pages total, XP032930313.

Communication dated Feb. 15, 2021 issued by the European Intellectual Property Office in counterpart European Application No. 20191911.5.

\* cited by examiner

VOICE RECOGNITION SYSTEM AND DISPLAY DEVICE USING THE SAME

CROSS-REFERENCE TO RELATED APPLICATION

This application is based on and claims priority from Korean Patent Application No. 10-2020-0002146, filed on Jan. 7, 2020, in the Korean Intellectual Property Office, the disclosure of which is incorporated herein in its entirety by reference.

BACKGROUND

1. Field

The disclosure relates to voice recognition systems and display devices using the same.

2. Description of Related Art

In a device used for voice recognition, when a microphone is located inside or outside the device, an acoustic hole is needed for good transmission of the voice of a user. In addition, a plurality of microphones are required to increase a voice recognition range, and relative locations between the plurality of microphones need to be appropriately adjusted.

SUMMARY

Provided are voice recognition systems and display devices using the same.

Additional aspects will be set forth in part in the description which follows and, in part, will be apparent from the description, or may be learned by practice of the presented embodiments of the disclosure.

According to an aspect of the disclosure, there is provided a voice recognition system comprising: a plate structure that vibrates based on propagation of a voice wave from a user, a vibration sensor provided to be in contact with the plate structure to detect vibration of the plate structure, and a voice recognition device configured to recognize voice of the user based on signal output from the vibration sensor.

The vibration sensor may be provided to have directivity in a direction of the user.

A surface of the vibration sensor facing the direction of the user may be provided to be in parallel with the plate structure.

The vibration sensor may comprise a displacement sensor.

The vibration sensor may comprise: a support board having a portion fixed to the plate structure, and at least one sensing element provided on the support board.

The vibration sensor may further comprise a mass provided on the support board.

The vibration sensor may comprise a plurality of support boards each having a portion fixed to the plate structure, and a plurality of sensing elements having different resonant frequencies, each of the plurality of sensing elements being provided on the plurality of support boards.

The voice recognition system may further comprise a case supporting the plate structure.

The voice recognition system may further comprise a vibration damping member provided between the plate structure and the case.

According to another aspect of the disclosure, there is provided a voice recognition system comprising: a plate structure that vibrates based on propagation of a voice wave from a user, a plurality of vibration sensors provided to be in contact with the plate structure, a signal processor configured to process signals output from the plurality of vibration sensors and a voice recognition device configured to recognize voice of the user based on the signals processed by the signal processor.

The plurality of vibration sensors may have directivity in a first direction, which is a direction of the user, and may be provided at locations determined based on values of displacements corresponding to the plate structure.

The plurality of vibration sensors may comprise: a first vibration sensor having directivity in the first direction, and a second vibration sensor having directivity in a second direction different from the first direction.

The voice recognition system may further comprise a case supporting the plate structure.

The voice recognition system may further comprise a vibration damping member provided between the plate structure and the case.

According to another aspect of the disclosure, there is provided a display device comprising: a display panel that vibrates based on propagation of a voice wave from a user; a case that supports the display panel; at least one vibration sensor provided to be in the case in contact with the display panel to detect the vibration of the display panel; and a voice recognition device configured to recognize voice of the user based on a signal output from the at least one vibration sensor.

The display device may further comprise a vibration damping member provided between the display panel and the case.

The at least one vibration sensor may be attached to a rear surface of the display panel.

The at least one vibration sensor may be provided to have directivity in a first direction, which is a direction of the user.

The at least one vibration sensor may comprise: a first vibration sensor having directivity in the first direction, and a second vibration sensor having directivity in a second direction different from the first direction.

The display device may further comprise a signal processor for processing signals output from the first and second vibration sensors and outputting the processed signals to the voice recognition device.

According to another aspect of the disclosure, there is provided a voice recognition apparatus comprising: a plate structure; and a vibration sensor provided on the plate structure to detect vibration of the plate structure, wherein the vibration sensor comprises: a substrate having a cavity and a support portion; and a sensing element provided on the support portion of the substrate.

The substrate may be attached to a rear surface of the plate structure.

The support board may be provided in parallel with the plate structure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
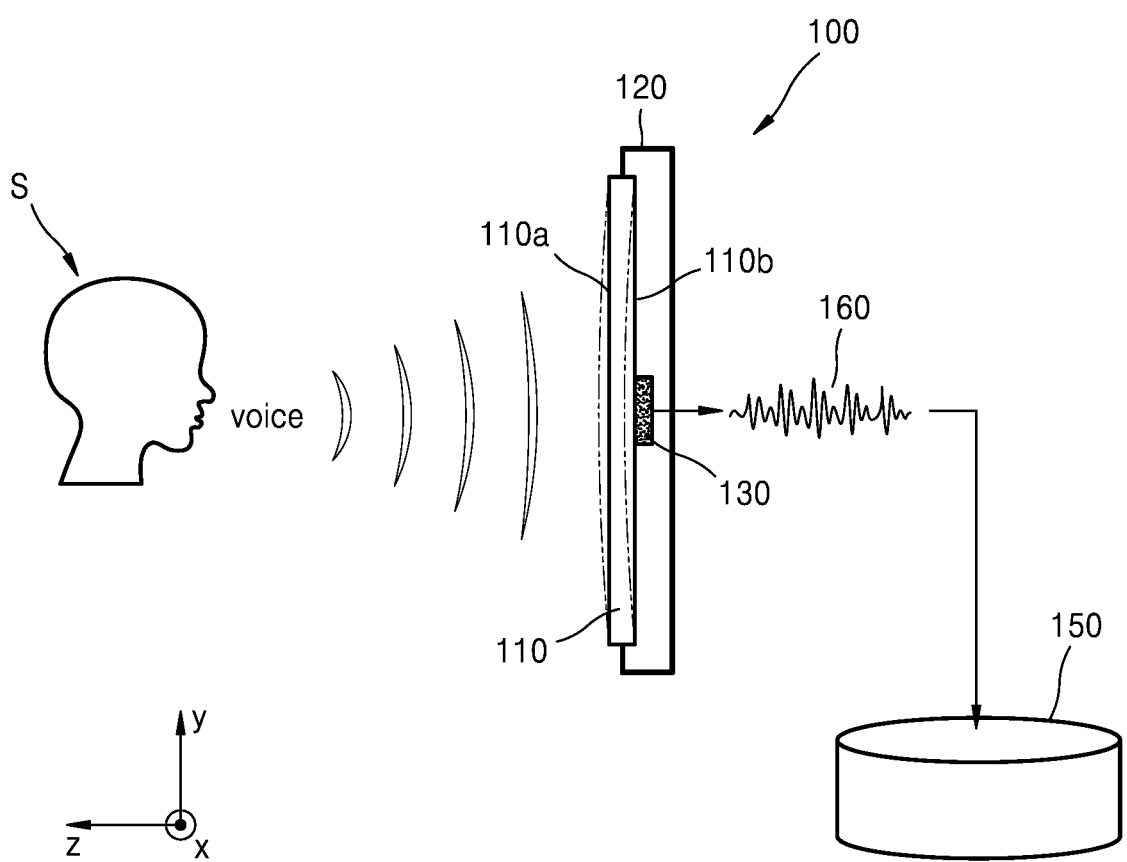
FIG. 1 is a schematic view of a voice recognition system according to an example embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, the disclosure will be described in detail by explaining embodiments of the disclosure with reference to the attached drawings. In the drawings, like reference numerals denote like elements and the sizes of elements may be exaggerated for clarity and convenience of explanation. Embodiments set forth herein are merely examples and may be modified in various ways.

In the following description, when an element is referred to as being "on" another element, it may be "directly" on another element or may be "indirectly" provided such that an intervening element is also present. The singular forms "a", "an", and "the" are intended to include the plural forms as well, unless the context clearly indicates otherwise. The terms "comprises", "comprising", "includes" and/or "including", when used herein, specify the presence of stated elements, but do not preclude the presence or addition of one or more other elements.

The definite article "the" or other demonstratives may indicate both a singular form and a plural form. Unless the context clearly indicates otherwise, operations included in a method may be performed in an appropriate order and are not limited to the order described herein.

As used herein, the term such as "unit" or "module" refers to an entity for processing at least one function or operation, and may be implemented by hardware, software, or a combination of hardware and software.

Connection lines or connection members between elements illustrated in the drawings represent examples of functional connections and/or physical or circuit connections, and may be represented as various replaceable or additional functional connections, physical connections, or circuit connections in an actual device.

All examples or exemplary terms are merely used to describe the technical features in detail and do not limit the scope of the disclosure unless defined by the claims.

FIG. 1 is a schematic view of a voice recognition system 100 according to an example embodiment.

Referring to FIG. 1, the voice recognition system 100 includes a plate structure 110, a vibration sensor 130, and a voice recognition device 150. The plate structure 110 may vibrate due to voice generated from the user S, and the vibration sensor 130 may be attached to the plate structure 110 to detect the vibration of the plate structure 110. The voice recognition device 150 may recognize the voice of the user S by receiving a signal 160 output from the vibration sensor 130.

In the voice recognition system 100 illustrated in FIG. 1, when a voice wave is generated and propagates from the user S, the plate structure 110 based on the voice wave. For instance, the plate structure 110 finely vibrates in synchronization with the voice wave. Due to the vibration, a dynamic change having a high correlation with a voice signal of the user S occurs at a portion of the plate structure 110 to which the vibration sensor 130 is attached. According to an example embodiment, the dynamic change may be one or more of a displacement, speed, acceleration, strain, or optical displacement, Then, the vibration sensor 130 may obtain the vibration causing the dynamic change, and the voice recognition device 150 may recognize the voice of the user S by receiving the output signal 160 obtained from the vibration sensor 130.

The plate structure 110 may generate the vibration due to the voice wave generated from the user S. Herein, the user S may located in a front direction of the plate structure 110, e.g., a z-axis direction in FIG. 1. The plate structure 110 may include a front surface 110a facing the user S, and a rear surface 110b opposite to the front surface 110a.

The plate structure 110 may have a form of a thin plate capable of generating vibration. The plate structure 110 may include, for example, a display panel, a smart window, or a smart mirror. However, these items are merely examples. For example, when a display panel is used as the plate structure 110, the voice recognition system 100 according to the current embodiment may be a display device.

According to an example embodiment, the voice recognition system 100 may include a case 120 provided outside the plate structure 110 to support the plate structure 110. Herein, the case 120 may be provided, for example, to cover the rear surface 110b of the plate structure 110. However, this configuration is merely an example. In some cases, the case 120 may not be provided.

The vibration sensor 130 serves to detect the vibration of the plate structure 110 due to the voice of the user S, and may be provided in contact with the plate structure 110. When the user S is located in the front direction of the plate structure 110, the vibration sensor 130 may be attached to, for example, the rear surface 110b of the plate structure 110. In this case, the vibration sensor 130 may be attached to, for example, a portion of the plate structure 110 where the vibration occurs the most, For instance, the vibration sensor 130 may be attached to a portion of the plate structure 110 at which the vibration has the largest impact in terms of position and/or speed of displacement of the plate structure 110. However, the disclosure is not limited thereto, and as such, in some cases, the vibration sensor 130 may be attached to a portion other than the rear surface 110b of the plate structure 110.

The vibration sensor 130 may include, for example, a displacement sensor for detecting a displacement generated due to vibration of the plate structure 110. In this case, the vibration sensor 130 may be provided in parallel with the plate structure 110 to have directivity in the front direction of the plate structure 110 (e.g., the z-axis direction in FIG. 1) corresponding to a user direction. That is, the vibration sensor 130 may be provided to have the planar surface of the vibration sensor 130 facing the direction of the user. According to an example embodiment, the vibration sensor 130 may be provided to have the planar surface of the vibration sensor 130 perpendicular to the direction of the user.

Figure 2:
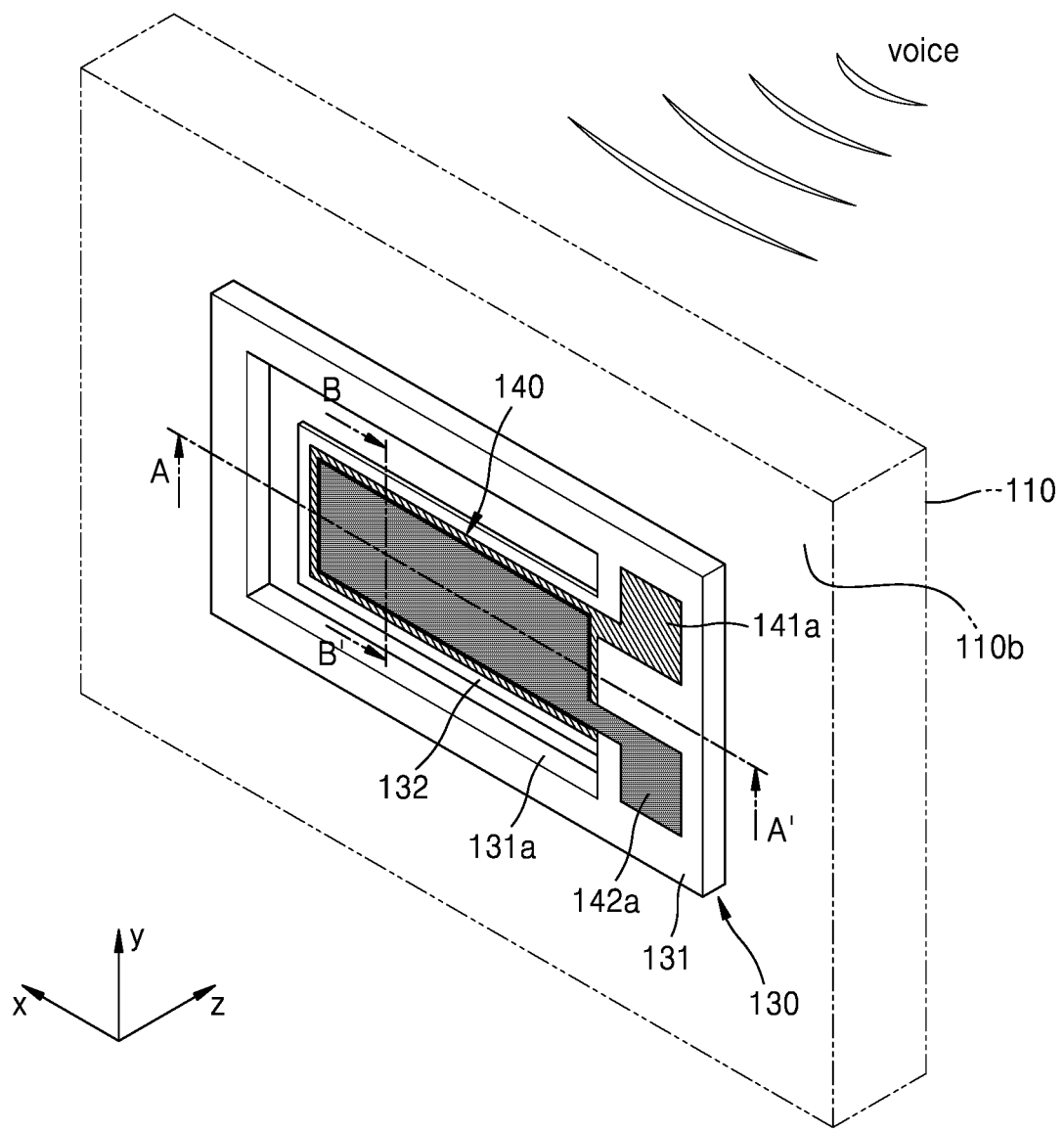
FIG. 2 is a perspective view of a vibration sensor illustrated in FIG. 1.
Figure 3:
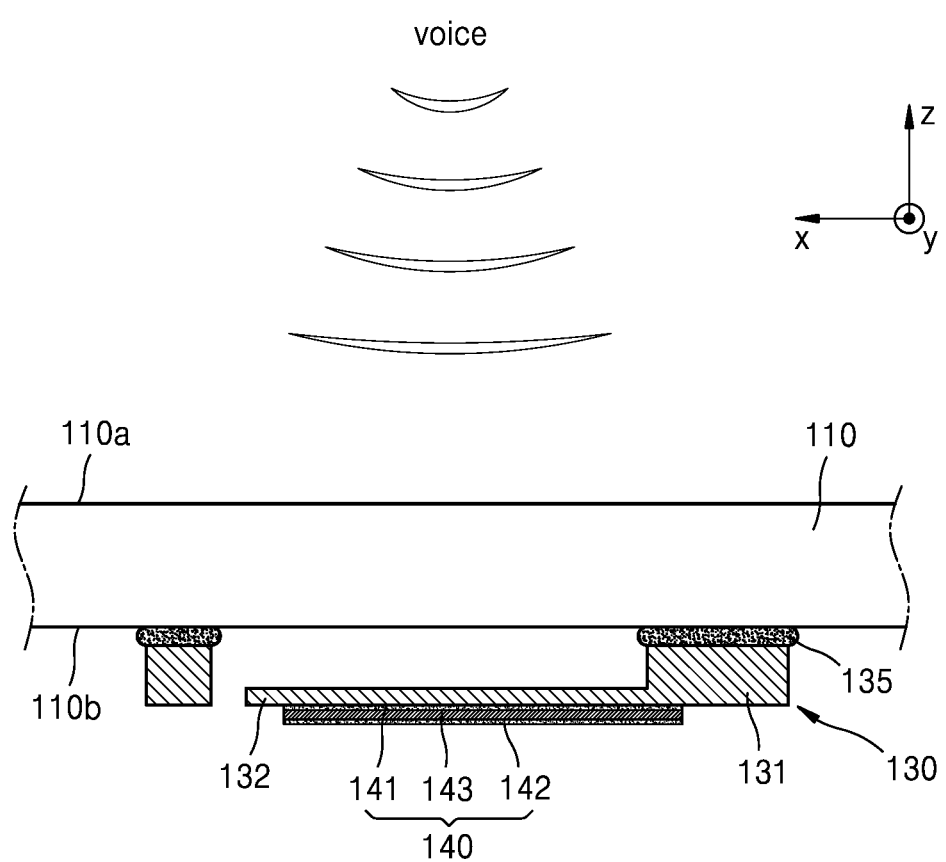
FIG. 3 is a cross-sectional view along line A-A' of FIG. 2.
Figure 4:
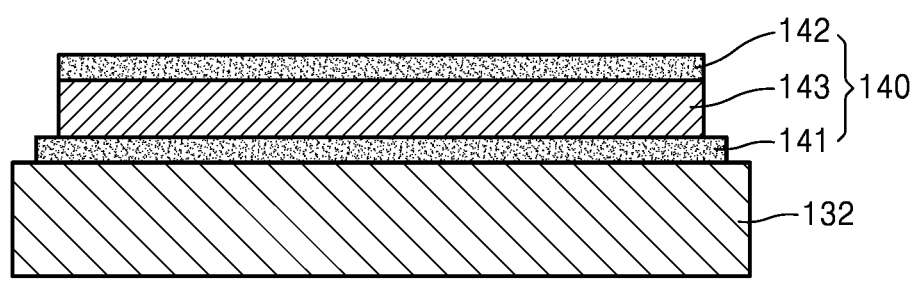
FIG. 4 is a cross-sectional view along line B-B' of FIG. 2.
Figure 4:
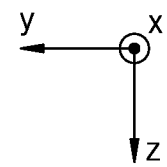

FIG. 2 is a perspective view of the vibration sensor 130 illustrated in FIG. 1. FIG. 3 is a cross-sectional view along line A-A' of FIG. 2, and FIG. 4 is a cross-sectional view along line B-B' of FIG. 2. The vibration sensor 130 illustrated in FIGS. 2 to 4 may be a displacement sensor for detecting a displacement generated due to vibration of the plate structure 110 caused by voice of the user S.

Referring to FIGS. 2 to 4, the vibration sensor 130 may include a substrate 131, and a sensing element 140 provided on the substrate 131. Herein, the substrate 131 may be attached to the rear surface 110b of the plate structure 110. An adhesive layer 135 for attaching the vibration sensor 130 to the plate structure 110 may be further provided between the substrate 131 and the plate structure 110.

The substrate 131 may have a cavity 131a that penetrates through the substrate 131, and a support board 132 that extends into the cavity 131a. Herein, the support board 132 is provided in parallel with the plate structure 110. The substrate 131 may use, for example, a silicon substrate, but is not limited thereto, and may use a substrate of various materials.

The support board 132 may have a cantilever structure, an end of which is fixed to the portion of the substrate 131 attached to the plate structure 110 and another end of which is freely movable along the user direction (e.g., the z-axis direction in FIG. 2).

The sensing element 140 is provided on a surface of the support board 132. Herein, the sensing element 140 may include a resonator having a certain resonant frequency. For example, the sensing element 140 may include a piezoelectric device for generating electric energy due to deformation of a piezoelectric body. In this case, the sensing element 140 includes a first electrode 141 provided on the support board 132, a piezoelectric layer 143 provided on the first electrode 141, and a second electrode 142 provided on the piezoelectric layer 143. Herein, the first and second electrodes 141 and 142 may be, for example, (+) and (−) electrodes, respectively. Alternatively, the first and second electrodes 141 and 142 may be (−) and (+) electrodes, respectively. The first and second electrodes 141 and 142 may be electrically connected to first and second terminals 141a and 142a provided on the substrate 131, respectively.

In the vibration sensor 130 illustrated in FIGS. 2 to 4, the displacement generated due to the vibration of the plate structure 110 caused by the voice of the user S may be transmitted to the end of the support board 132 fixed to the plate structure 110, and the other end of the support board 132 may vibrate due to an inertial force to amplify the displacement.

In the current embodiment, the vibration sensor 130 may be provided in parallel with the plate structure 110 (e.g., an xy plane) to have directivity in the user direction (e.g., the z-axis direction).

Figure 5:
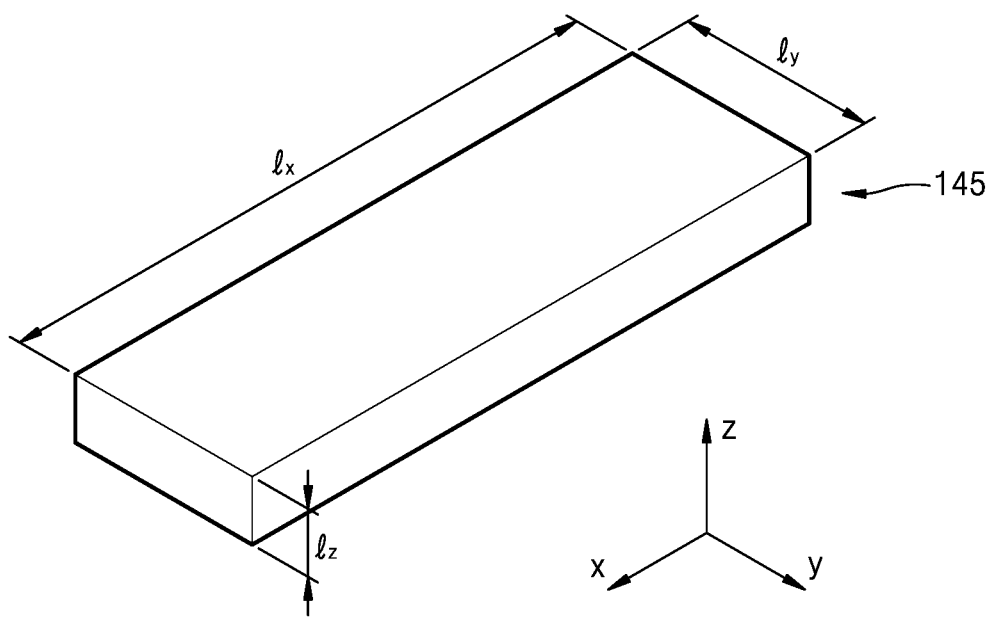
FIG. 5 is a perspective view of an equivalent model made of an isotropic material of a sensing element provided on a support board in FIGS. 2 to 4.

FIG. 5 is a perspective view of an equivalent model 145 made of an isotropic material of the sensing element 140 provided on the support board 132 in FIGS. 2 to 4 according to an example embodiment. In FIG. 5, $l_x$, $l_y$, and $l_z$ denote a length (a dimension in an x-axis direction), a width (a dimension in a y-axis direction), and a thickness (a dimension in a z-axis direction) of the equivalent model 145, respectively.

Equation 1 represents a ratio of a stiffness in the y-axis direction to that in the z-axis direction, and Equation 2 represents a ratio of a stiffness in the x-axis direction to that in the z-axis direction. In Equations 1 and 2, E denotes Young's modulus.

$$\frac{k_y}{k_x} = \frac{\frac{1}{4}El_z\left(\frac{l_y}{l_x}\right)^3}{\frac{1}{4}El_y\left(\frac{l_z}{l_x}\right)^3} = \left(\frac{l_y}{l_z}\right)^2 \quad (1)$$

$$\frac{k_x}{k_z} = \frac{El_zl_y/l_x}{\frac{1}{4}El_y\left(\frac{l_z}{l_x}\right)^3} = 4\left(\frac{l_x}{l_z}\right)^2 \quad (2)$$

Assuming that the thickness $l_z$, the width $l_y$, and the length $l_x$ of the equivalent model 145 are 2 μm, 100 μm, and 1000 μm, respectively, as an example of dimensions of a general small sensor, according to Equations 1 and 2, the stiffness in the y-axis direction is about 2,500 times greater than the stiffness in the z-axis direction, and the stiffness in the x-axis direction is about 25,000 times greater than the stiffness in the z-axis direction.

Because the stiffness in the x-axis direction and the stiffness in the y-axis direction are much greater than the stiffness in the z-axis direction as described above, it is shown that the equivalent model 145 has directivity in the z-axis direction.

Therefore, when the plate structure 110 vibrates, the vibration sensor 130 provided in parallel with the plate structure 110 may dominantly obtain a signal from the z-axis direction corresponding to the user direction, compared to a signal from the x-axis or y-axis direction (e.g., an acoustic signal generated from a speaker mounted in a case).

Figure 6:
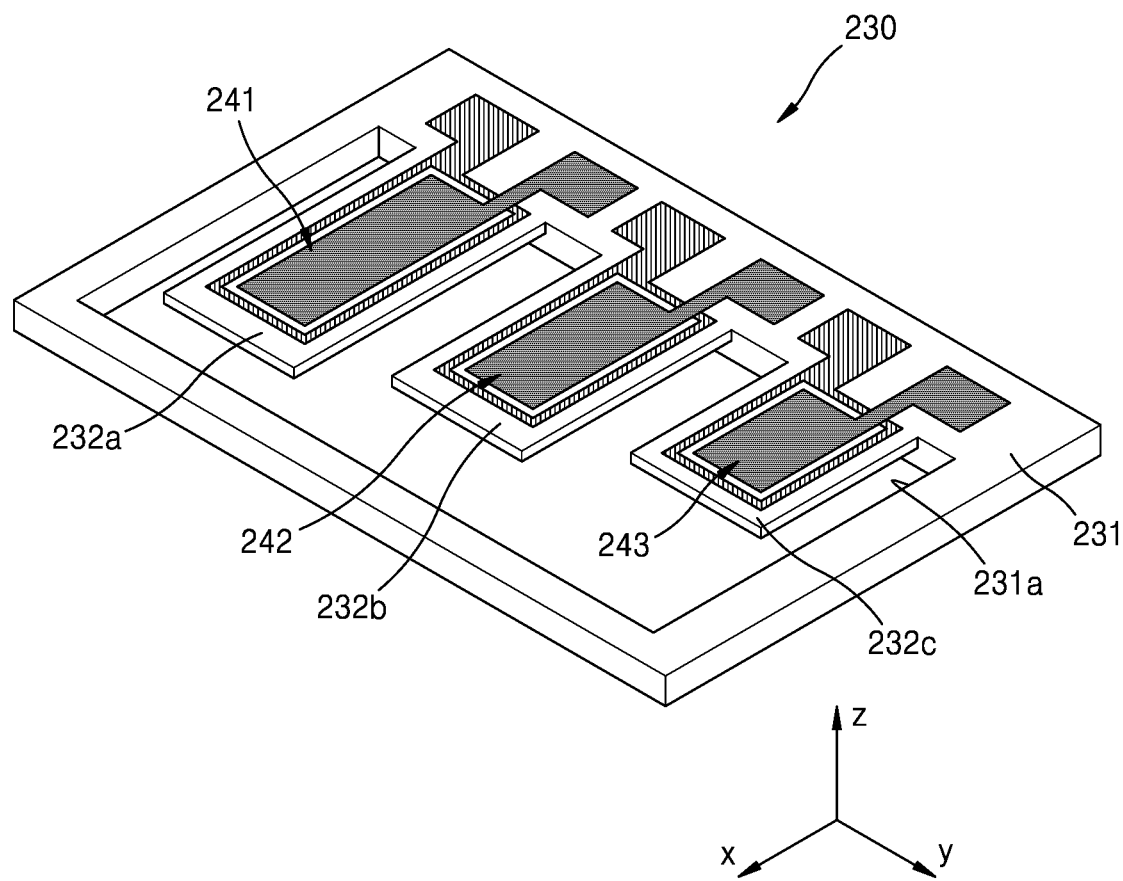
FIG. 6 is a perspective view of another example vibration sensor employable in the voice recognition system illustrated in FIG. 1.

FIG. 6 is a perspective view of another example vibration sensor 230 employable in the voice recognition system 100 illustrated in FIG. 1.

Referring to FIG. 6, the vibration sensor 230 includes a plurality of sensing elements 241, 242, and 243 provided on a substrate 231. A cavity 231a penetrates through the substrate 231, and a plurality of support boards 232a, 232b, and 232c extend from the substrate 231 into the cavity 231a. Herein, the plurality of support boards 232a, 232b, and 232c may be provided in parallel with the plate structure 110 (see FIG. 1).

Each of the plurality of support boards 232a, 232b, and 232c may have a cantilever structure, an end of which is fixed to the substrate 231 attached to the plate structure 110 and another end of which is freely movable along a user direction (e.g., a z-axis direction in FIG. 6).

The plurality of sensing elements 241, 242, and 243 are provided on the plurality of support boards 232a, 232b, and 232c, respectively. As described above, each of the plurality of sensing elements 241, 242, and 243 may include, for example, a piezoelectric device for generating electric energy due to deformation of a piezoelectric body.

The plurality of sensing elements 241, 242, and 243 may be provided to have different resonant frequencies. To this end, the plurality of sensing elements 241, 242, and 243 may be provided to have different dimensions. For example, the plurality of sensing elements 241, 242, and 243 may have at least one of different lengths, different widths, and different thicknesses. FIG. 6 illustrates an example in which the plurality of support boards 232*a*, 232*b*, and 232*c* having different lengths are provided on the substrate 231 and the plurality of sensing elements 241, 242, and 243 having different lengths are provided on the support boards 232*a*, 232*b*, and 232*c*.

Although three sensing elements 241, 242, and 243 having three different resonant frequencies are illustrated in FIG. 6, three is merely an example and the number of sensing elements 241, 242, and 243 may be variously changed.

Because the vibration sensor 230 includes the plurality of sensing elements 241, 242, and 243 having different resonant frequencies as described above, a voice signal of a wide frequency band may be recognized.

FIGS. 7 to 10 illustrate other example vibration sensors 371, 372, 373, and 374 employable in the voice recognition system 100 illustrated in FIG. 1.

Figure 7:
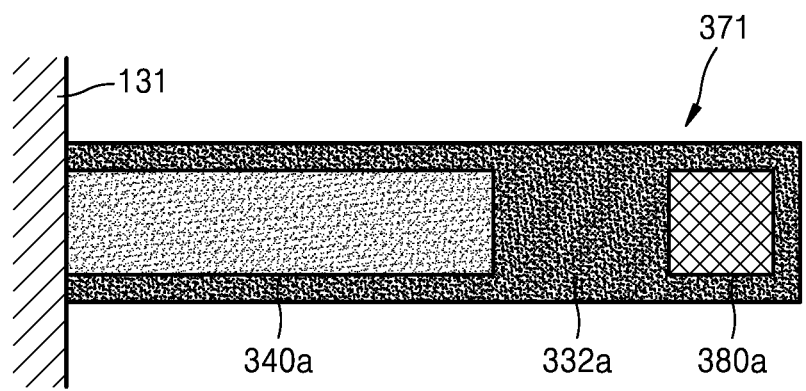
FIGS. 7 to 10 illustrate other example vibration sensors employable in the voice recognition system illustrated in FIG. 1.

The vibration sensor 371 illustrated in FIG. 7 includes a support board 332*a*, and a sensing element 340*a* provided on the support board 332*a*. Herein, the support board 332*a* may have a cantilever structure including a fixed end. Specifically, the support board 332*a* may have a structure, an end of which is fixed to the substrate 131 attached to the plate structure 110 (see FIG. 1) and another end of which is freely movable in the user direction. The sensing element 340*a* may be provided near the fixed portion of the support board 332*a*. A mass 380*a* capable of increasing an inertial force may be further provided on the other end of the support board 332*a* to increase the sensitivity of the vibration sensor 371.

Figure 8:
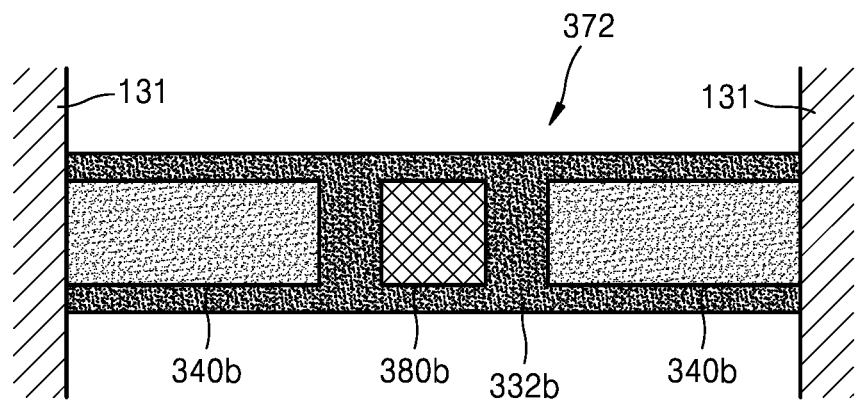

The vibration sensor 372 illustrated in FIG. 8 includes a support board 332*b*, and a plurality of sensing elements 340*b* provided on the support board 332*b*. Herein, the support board 332*b* may have a bridge structure including two fixed ends. Specifically, the support board 332*b* may have a structure, two ends of which are fixed to the substrate 131 attached to the plate structure 110 and a middle portion of which is freely movable in the user direction. The plurality of sensing elements 340*b* may be provided near the fixed portions of the support board 332*b*. FIG. 8 illustrates an example in which two sensing elements 340*b* are provided on the support board 332*b*. However, the number of sensing elements 340*b* is not limited thereto and a single sensing element 340*b* may be provided on the support board 332*b*. A mass 380*b* may be further provided on a middle portion of the support board 332*b* to increase the sensitivity of the vibration sensor 372.

Figure 9:
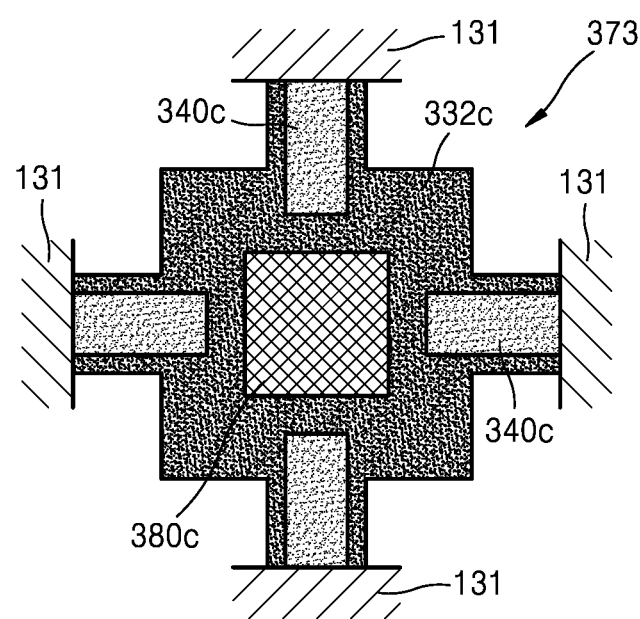

FIG. 9 illustrates an example in which the vibration sensor 373 includes a support board 332*c*, and a plurality of sensing elements 340*c* provided on the support board 332*c*. Herein, the support board 332*c* may have a polygonal structure including four fixed ends. The plurality of sensing elements 340*c* may be provided near the fixed portions of the support board 332*c*. FIG. 9 illustrates an example in which four sensing elements 340*c* are provided on the support board 332*c*. However, the number of sensing elements 340*c* is not limited thereto and various numbers of sensing elements 340*c* may be provided on the support board 332*c*. A mass 380*c* may be further provided on a middle portion of the support board 332*c* to increase the sensitivity of the vibration sensor 373.

FIG. 9 illustrates an example in which the vibration sensor 373 includes the polygonal support board 332*c* including four fixed ends. However, four is merely an example and the vibration sensor 373 may include various polygonal support boards including three fixed ends or five or more fixed ends.

Figure 10:
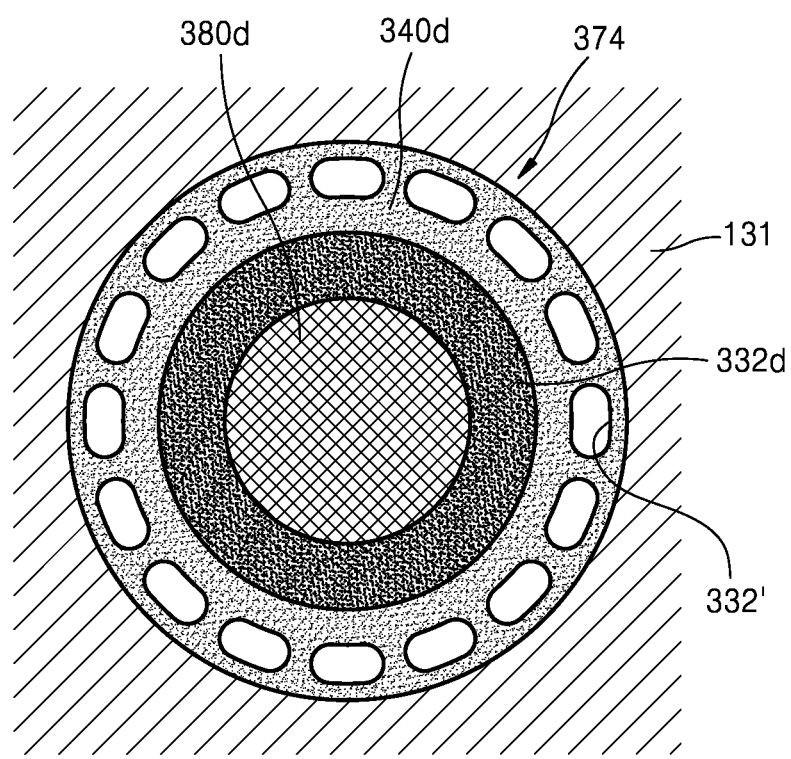

FIG. 10 illustrates an example in which the vibration sensor 374 includes a support board 332*d*, and a sensing element 340*d* provided on the support board 332*d*. Herein, the support board 332*d* may have a circular structure, a circumference of which is fixed. The sensing element 340*d* may be provided along the fixed portion of the support board 332*d*. FIG. 10 illustrates an example in which a single sensing element 340*d* is provided on the support board 332*d*. However, the number of sensing elements 340*d* is not limited thereto and a plurality of sensing elements 340*d* may be provided on the support board 332*d*. A mass 380*d* may be further provided on a middle portion of the support board 332*d* to increase the sensitivity of the vibration sensor 374. In addition, at least one through-hole 332' for adjusting a stiffness of the support board 332*d* may be provided in the support board 332*d*.

In the voice recognition system 100 illustrated in FIG. 1, the vibration sensor 130, 230, 371, 372, 373, or 374 may detect vibration of the plate structure 110 generated due to voice of the user S, and the voice recognition device 150 may recognize the voice of the user S by receiving the signal 160 output from the vibration sensor 130, 230, 371, 372, 373, or 374.

In the voice recognition system 100 according to the current embodiment, because the vibration sensor 130, 230, 371, 372, 373, or 374 may be provided in contact with the plate structure 110 to detect the vibration of the plate structure 110 due to the voice of the user S, an acoustic hole or the like for transmitting the voice of the user S well may not be required. Furthermore, because the vibration sensor 130, 230, 371, 372, 373, or 374 may be attached to the rear surface 110*b* of the plate structure 110 which is not seen by the user S, a design of the front surface 110*a* of the plate structure 110 may not be restricted by the vibration sensor 130, 230, 371, 372, 373, or 374. In addition, because the vibration sensor 130, 230, 371, 372, 373, or 374 may be provided in parallel with the plate structure 110 to have directivity in the user direction, only the voice signal from the user direction may be dominantly obtained.

A case in which the vibration sensor includes a displacement sensor for detecting a displacement generated due to vibration of the plate structure 110 is described above. However, the displacement sensor is merely an example and the vibration sensor may include other types of sensors.

For example, the vibration sensor may include an inertial sensor for detecting an inertial force generated due to vibration of the plate structure 110 caused by voice of the user S, a strain sensor for detecting a strain generated due to vibration of the plate structure 110 caused by voice of the user S, or an optical sensor for detecting an optical displacement generated due to vibration of the plate structure 110 caused by voice of the user S. Herein, the inertial sensor, the strain sensor, and the optical sensor are generally well known and thus detailed descriptions thereof will not be provided herein.

Figure 11:
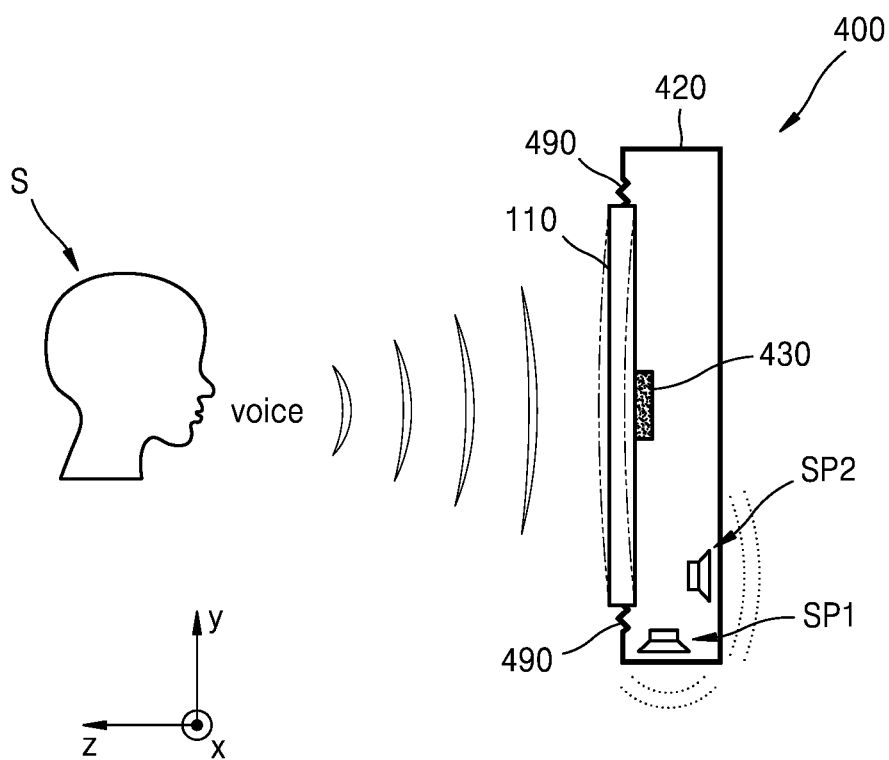
FIG. 11 is a schematic view of a voice recognition system according to another example embodiment.

FIG. 11 is a schematic view of a voice recognition system 400 according to another example embodiment. For the sake of convenience, the voice recognition device 150 illustrated in FIG. 1 is not illustrated in FIG. 11.

Referring to FIG. 11, the voice recognition system 400 includes the plate structure 110, a vibration sensor 430, the voice recognition device 150 (see FIG. 1), a case 420, and a vibration damping member 490.

Descriptions of the plate structure 110 and the voice recognition device 150 are provided above and thus will not be repeated herein. The vibration sensor 430 may correspond to one of the above-described vibration sensors 130, 230, 371, 372, 373, and 374, and a detailed description thereof will not be provided herein.

The case 420 is provided to support the plate structure 110. For example, the case 420 may be provided to cover a rear surface of the plate structure 110. The vibration damping member 490 capable of suppressing transmission of vibration of the case 420 to the plate structure 110 may be provided between the plate structure 110 and the case 420. Herein, the vibration damping member 490 may include, for example, an elastic material.

For example, when speakers SP1 and SP2 are mounted in the case 420, the case 420 vibrates due to sound generated from the speakers SP1 and SP2 and the vibration may be transmitted to the plate structure 110. In the voice recognition system 400 according to the example embodiment, since the vibration damping member 490 is provided between the plate structure 110 and the case 420, vibration of the case 420 generated due to sound generated from the speakers SP1 and SP2 may be prevented from being transmitted to the plate structure 110 by the vibration damping member 490, and thus the vibration sensor 430 may react well to voice of the user S.

Figure 12:
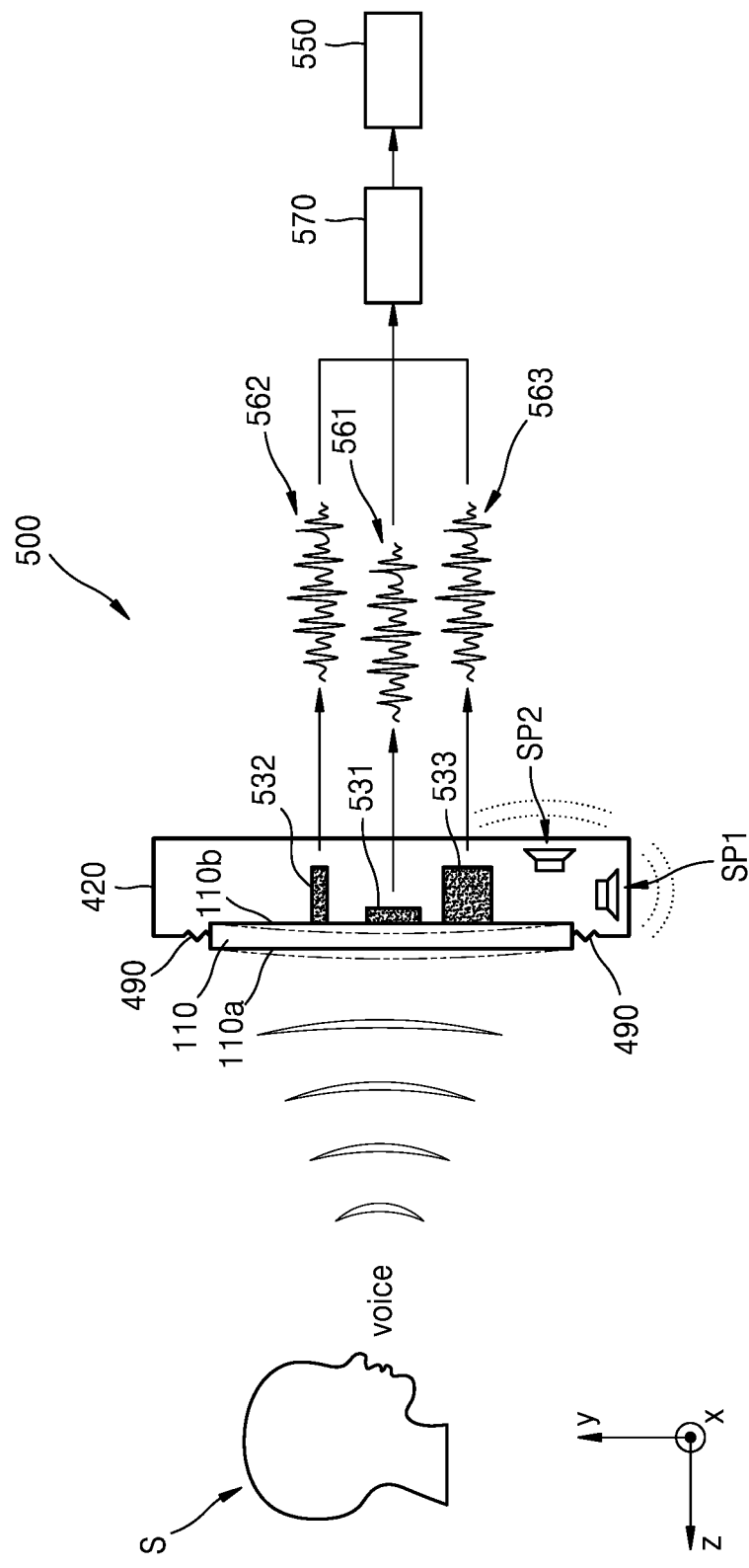
FIG. 12 is a schematic view of a voice recognition system according to another example embodiment.

FIG. 12 is a schematic view of a voice recognition system 500 according to another example embodiment.

Referring to FIG. 12, the voice recognition system 500 includes the plate structure 110, a plurality of vibration sensors 531, 532, and 533 attached to the plate structure 110, a signal processor 570, and a voice recognition device 550. The plate structure 110 may be supported by the case 420, and the vibration damping member 490 for suppressing transmission of vibration of the case 420 to the plate structure 110 may be provided between the plate structure 110 and the case 420. Descriptions of the plate structure 110, the case 420, and the vibration damping member 490 are provided above and thus will not be repeated herein.

The user S may be located in a front direction of the plate structure 110, e.g., a z-axis direction in FIG. 12. The plate structure 110 may include a front surface 110a facing the user S, and a rear surface 110b opposite to the front surface 110a. The plurality of vibration sensors 531, 532, and 533 are attached to the plate structure 110. For example, the plurality of vibration sensors 531, 532, and 533 may be attached to the rear surface 110b of the plate structure 110, but are not limited thereto.

The plurality of vibration sensors 531, 532, and 533 may include first, second, and third vibration sensors 531, 532, and 533. Herein, the first, second, and third vibration sensors 531, 532, and 533 may have different directivities depending on directions in which they are attached to the plate structure 110. Each of the first, second, and third vibration sensors 531, 532, and 533 may have the same configuration as one of the above-described vibration sensors 130, 230, 371, 372, 373, and 374.

The first vibration sensor 531 may serve to detect vibration of the plate structure 110 due to voice of the user S, and may be attached in parallel with the plate structure 110 as described above. Specifically, the first vibration sensor 531 may be provided in parallel with an xy plane in FIG. 12 to have directivity in a user direction (i.e., the z-axis direction). Therefore, the first vibration sensor 531 may dominantly detect vibration of the plate structure 110 in the z-axis direction.

The second vibration sensor 532 may serve to detect vibration of the plate structure 110 due to a sound source other than the user S, e.g., the speakers SP1 and SP2 mounted in the case 420, and may be attached, for example, perpendicularly to the plate structure 110. Specifically, the second vibration sensor 532 may be provided in parallel with an xz plane in FIG. 12 to have directivity in a y-axis direction. Therefore, the second vibration sensor 532 may dominantly detect vibration of the plate structure 110 in the y-axis direction.

The third vibration sensor 533 may serve to detect vibration of the plate structure 110 due to a sound source other than the user S, e.g., the speakers SP1 and SP2 mounted in the case 420, and may be attached, for example, perpendicularly to the plate structure 110. Specifically, the third vibration sensor 533 may be provided in parallel with a yz plane in FIG. 12 to have directivity in an x-axis direction. Therefore, the third vibration sensor 533 may dominantly detect vibration of the plate structure 110 in the x-axis direction.

A first output signal 561 output from the first vibration sensor 531, a second output signal 562 output from the second vibration sensor 532, and a third output signal 563 output from the third vibration sensor 533 are input to the signal processor 570. The signal processor 570 may combine and process the first, second, and third output signals 561, 562, and 563, and then the voice recognition device 550 may recognize the voice of the user S by receiving the processed signal.

In the example embodiment, the signal processor 570 may effectively damp signals other than the user voice by differentiating and removing signals due to vibration in directions (e.g., the x-axis and y-axis directions) other than the z-axis direction corresponding to the user direction.

FIGS. 13A to 13F illustrate voice recognition systems according to other example embodiments. FIGS. 13A to 13F illustrate vibration sensors 631, 632, 633, 634, 635, and 636 provided in various ways on the rear surface 110b of the plate structure 110. The vibration sensors 631, 632, 633, 634, 635, and 636 described below may correspond to one of the above-described vibration sensors 130, 230, 371, 372, 373, and 374.

Figure 13A:
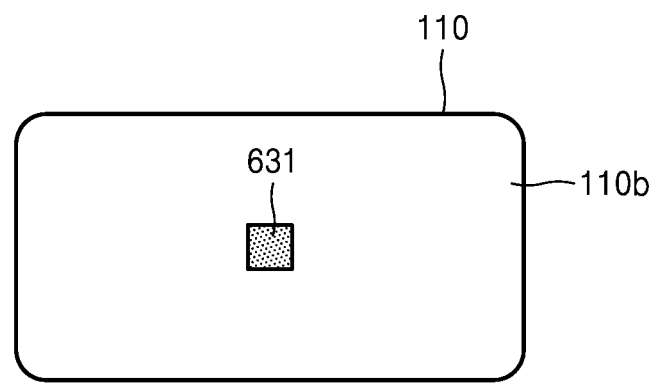
FIGS. 13A to 13F illustrate voice recognition systems according to other example embodiments.
Figure 13B:
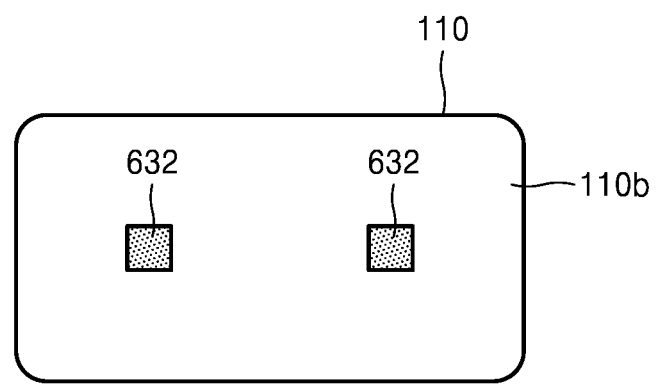

FIGS. 13A to 13F illustrate examples in which the vibration sensors 631, 632, 633, 634, 635, and 636 are provided at portions of the plate structure 110 where largest displacements are generated due to voice of the user S. FIG. 13A illustrates a case in which a single vibration sensor 631 is provided on the plate structure 110, and FIGS. 13B to 13F illustrate cases in which pluralities of vibration sensors 632, 633, 634, 635, and 636 are provided on the plate structure 110. When the plurality of vibration sensors 632, 633, 634, 635, or 636 are provided on the plate structure 110, output signals detected by the plurality of vibration sensors 632, 633, 634, 635, or 636 may be processed by a signal processor and then be input to a voice recognition device Referring to FIG. 13A, when a large displacement is generated at a middle portion of the plate structure 110 due to the voice of the user S, the vibration sensor 631 may be provided on the middle portion of the plate structure 110. Referring to FIG. 13B, when large displacements are generated at left and right portions of the plate structure 110 due to the voice of the user S, the vibration sensors 632 may be provided on the left and right portions.

Figure 13C:
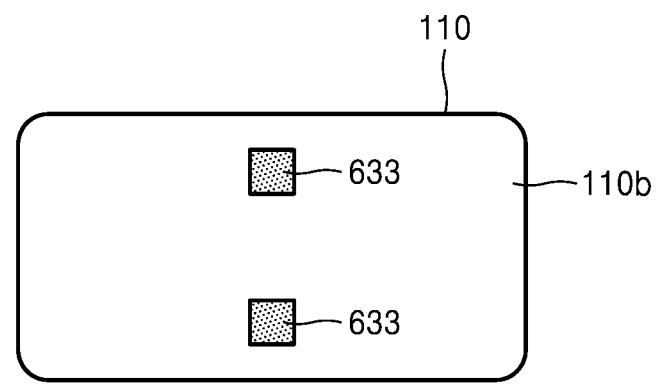
Figure 13D:
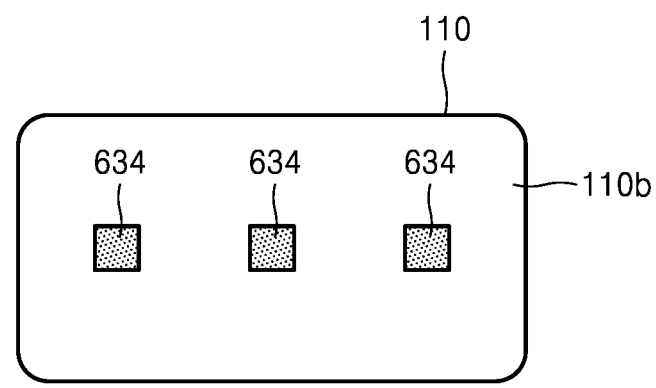

Referring to FIG. 13C, when large displacements are generated at upper and lower portions of the plate structure 110 due to the voice of the user S, the vibration sensors 633 may be provided on the upper and lower portions. Referring to FIG. 13D, when large displacements are generated at left, middle, and right portions of the plate structure 110 due to the voice of the user S, the vibration sensors 634 may be provided on the left, middle, and right portions.

Figure 13E:
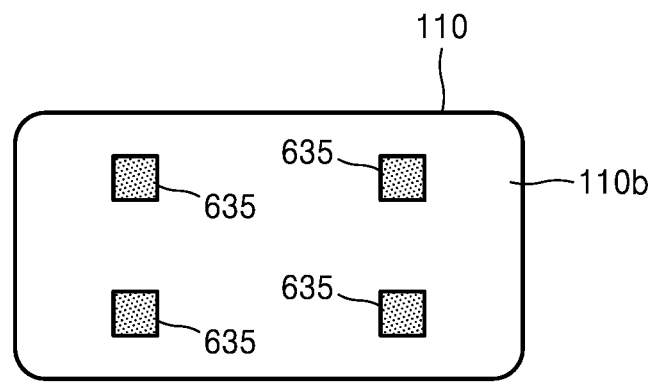
Figure 13F:
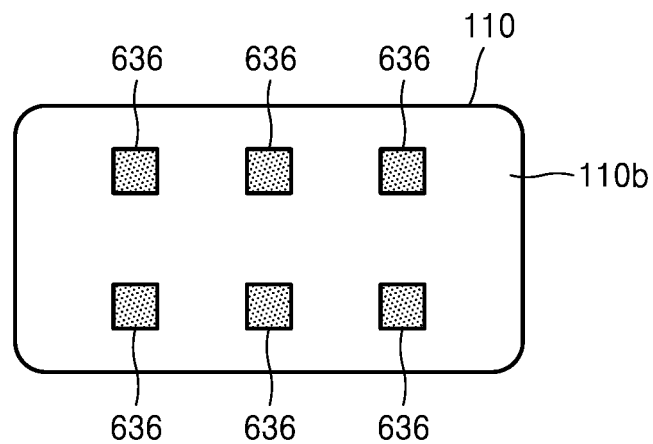

The vibration sensors 635 may be provided on four portions of the plate structure 110 as illustrated in FIG. 13E, or the vibration sensors 636 may be provided on six portions of the plate structure 110 as illustrated in FIG. 13F.

As described above, according to example embodiments, because a vibration sensor may be provided in contact with a plate structure to detect vibration of the plate structure due to voice of a user, an acoustic hole or the like for transmitting the voice of the user well may not be required. Furthermore, because the vibration sensor may be attached to a rear surface of the plate structure which is not seen by the user, a design of a front surface of the plate structure may not be restricted by the vibration sensor. In addition, because the vibration sensor may be provided in parallel with the plate structure to have directivity in a user direction, only a voice signal from the user direction may be dominantly obtained.

The elements of the voice recognition system described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A voice recognition system comprising:
   a plate structure that vibrates based on propagation of a voice wave from a user;
   a vibration sensor provided to be in contact with the plate structure to detect vibration of the plate structure, the vibration sensor having a planar shape; and
   a voice recognition circuit configured to recognize voice of the user based on signal output from the vibration sensor,
   wherein the vibration sensor has a first end fixed to the plate structure, and a second end detached from the plate structure.

2. The voice recognition system of claim 1, wherein the vibration sensor is provided to have directivity in a direction of the user.

3. The voice recognition system of claim 2, wherein a surface of the vibration sensor facing the direction of the user is provided to be in parallel with the plate structure.

4. The voice recognition system of claim 1, wherein the vibration sensor comprises a displacement sensor.

5. The voice recognition system of claim 4, wherein the vibration sensor comprises:
   a support board having a portion fixed to the plate structure, and
   at least one sensing element provided on the support board.

6. The voice recognition system of claim 5, wherein the vibration sensor further comprises a mass provided on the support board.

7. The voice recognition system of claim 4, wherein the vibration sensor comprises:
   a plurality of support boards each having a portion fixed to the plate structure, and
   a plurality of sensing elements having different resonant frequencies, each of the plurality of sensing elements being provided on the plurality of support boards.

8. The voice recognition system of claim 1, further comprising a case supporting the plate structure.

9. The voice recognition system of claim 8, further comprising a vibration damping member provided between the plate structure and the case.

10. A voice recognition system comprising:
a plate structure that vibrates based on propagation of a voice wave from a user;
a plurality of vibration sensors provided to be in contact with the plate structure, one or more of the plurality of vibration sensors having a planar shape;
a signal processor circuit configured to process signals output from the plurality of vibration sensors; and
a voice recognition circuit configured to recognize voice of the user based on the signals processed by the signal processor circuit,
wherein the one or more of the plurality of vibration sensors has a first end fixed to the plate structure, and a second end detached from the plate structure.

11. The voice recognition system of claim 10, wherein the plurality of vibration sensors have directivity in a first direction, which is a direction of the user, and are provided at locations determined based on values of displacements corresponding to the plate structure.

12. The voice recognition system of claim 10, wherein the plurality of vibration sensors comprise:
a first vibration sensor having directivity in a first direction, and
a second vibration sensor having directivity in a second direction different from the first direction.

13. The voice recognition system of claim 10, further comprising a case supporting the plate structure.

14. The voice recognition system of claim 13, further comprising a vibration damping member provided between the plate structure and the case.

15. A display device comprising:
a display panel that vibrates based on propagation of a voice wave from a user;
a case that supports the display panel;
at least one vibration sensor provided to be in the case in contact with the display panel to detect a vibration of the display panel, the at least one vibration sensor having a planar shape; and
a voice recognition circuit configured to recognize voice of the user based on a signal output from the at least one vibration sensor,
wherein the at least one vibration sensor has a first end fixed to a plate structure, and a second end detached from the plate structure.

16. The display device of claim 15, further comprising a vibration damping member provided between the display panel and the case.

17. The display device of claim 15, wherein the at least one vibration sensor is attached to a rear surface of the display panel.

18. The display device of claim 15, wherein the at least one vibration sensor is provided to have directivity in a first direction, which is a direction of the user.

19. The display device of claim 15, wherein the at least one vibration sensor comprises:
a first vibration sensor having directivity in a first direction, and
a second vibration sensor having directivity in a second direction different from the first direction.

20. The display device of claim 19, further comprising a signal processor circuit for processing signals output from the first and second vibration sensors and outputting the processed signals to the voice recognition circuit.

21. A voice recognition apparatus comprising:
a plate structure; and
a vibration sensor provided on the plate structure to detect vibration of the plate structure, the vibration sensor having a planar shape,
wherein the vibration sensor comprises:
a substrate having a cavity and a support portion; and
a sensing element provided on the support portion of the substrate, and
wherein the vibration sensor has a first end fixed to the plate structure, and a second end detached from the plate structure.

22. The voice recognition apparatus according to claim 21, wherein the substrate is attached to a rear surface of the plate structure.

23. The voice recognition apparatus according to claim 21, wherein the support portion is provided in parallel with the plate structure.

24. The voice recognition system of claim 1, wherein the vibration sensor comprises:
a first electrode;
a piezoelectric layer provided on the first electrode, and
a second electrode provided on the piezoelectric layer.

25. The voice recognition system of claim 1, wherein the vibration sensor comprises:
a support board having a first end fixed to the plate structure, and a second end, which is detached from the plate structure.

* * * * *